(12) United States Patent
Fernandes (10) Patent No.: US 9,902,412 B2
(45) Date of Patent: Feb. 27, 2018

(54) REMOTELY ARMING HEAD OF TRAIN DEVICE TO END OF TRAIN DEVICE

(71) Applicant: SIEMENS INDUSTRY, INC., Alpharetta, GA (US)

(72) Inventor: Mario Fernandes, Jacksonville, FL (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 70 days.

(21) Appl. No.: 14/870,083

(22) Filed: Sep. 30, 2015

(65) Prior Publication Data
US 2017/0088153 A1   Mar. 30, 2017

(51) Int. Cl.
| | |
|---|---|
| B61L 25/02 | (2006.01) |
| B60T 8/17 | (2006.01) |
| B60T 17/22 | (2006.01) |
| B61L 23/00 | (2006.01) |
| B61L 15/00 | (2006.01) |

(52) U.S. Cl.
CPC .......... B61L 25/028 (2013.01); B60T 8/1705 (2013.01); B60T 17/221 (2013.01); B61L 15/009 (2013.01); B61L 15/0027 (2013.01); B61L 15/0054 (2013.01); B61L 23/00 (2013.01)

(58) Field of Classification Search
None
See application file for complete search history.

(56) References Cited

U.S. PATENT DOCUMENTS 6,227,625 B1   5/2001  Gaughan
6,505,104 B2 *  1/2003  Collins .................. B61L 1/14
                                                           246/167 R (Continued)

FOREIGN PATENT DOCUMENTS

DE    102012216391 A1    3/2014

OTHER PUBLICATIONS

Association of American Railroads (AAR), AAR Manual of Standards and Recommended Practices Locomotive Electronics and Train Consist System Architecture, END_OF_TRAIN Communications Standard S-9152.V2.1 (Formerly MSRP Standard S-5701), Aug. 2014, pp. 365-400, USA.

Primary Examiner — Truc M Do (57) ABSTRACT

A system to arm one device with another device on a freight train having a locomotive and a last car is provided. The system comprises an end of train (EOT) device disposed in the last car of the freight train and a head of train (HOT) device disposed in the locomotive of the freight train. The EOT device includes a soft button which is configured to be virtually pressed in response to an electronic command. The HOT device includes a button which is configured to be pressed by a user. A web-based service at a central server is configured to receive an initiate arming sequence command from a wireless communication device of the user and issue the electronic command to the EOT device to virtually press the soft button via a web user interface. The first radio is configured to transmit an arming request message to the HOT device for displaying on the display of the HOT device. The user is prompted to press the button of the HOT device to cause the HOT device to proceed with an arming process with the EOT device.

16 Claims, 4 Drawing Sheets

(56) References Cited

U.S. PATENT DOCUMENTS

| | | | | |
|---|---|---|---|---|
| 2002/0004693 | A1* | 1/2002 | Collins | B61L 1/14 |
| | | | | 701/19 |
| 2007/0170314 | A1* | 7/2007 | Kane | B61L 15/0027 |
| | | | | 246/6 |
| 2010/0029209 | A1* | 2/2010 | Daum | B61L 15/0027 |
| | | | | 455/59 |
| 2010/0130124 | A1* | 5/2010 | Teeter | B61L 15/0027 |
| | | | | 455/15 |
| 2010/0213321 | A1* | 8/2010 | Kane | B61L 15/0027 |
| | | | | 246/167 R |
| 2010/0235022 | A1* | 9/2010 | Siddappa | B61C 17/12 |
| | | | | 701/20 |
| 2011/0015876 | A1* | 1/2011 | Smith | B60T 13/662 |
| | | | | 702/41 |
| 2011/0172856 | A1* | 7/2011 | Kull | B61L 15/0027 |
| | | | | 701/19 |
| 2011/0251742 | A1* | 10/2011 | Haas | B61L 15/0054 |
| | | | | 701/19 |
| 2015/0291193 | A1* | 10/2015 | Perras | B61L 25/025 |
| | | | | 246/122 R |

* cited by examiner

REMOTELY ARMING HEAD OF TRAIN DEVICE TO END OF TRAIN DEVICE

BACKGROUND

1. Field

Aspects of the present invention generally relate to operating trains and more specifically relates to a single person remote arming of a head of train device located in a locomotive to an end of train device of a freight train located in a last car.

2. Description of the Related Art

An End of Train (EOT) device is an electronic device mounted on the end of freight trains in lieu of a caboose. They are divided into two categories: "dumb" units, which only provide a visible indication of the rear of the train with a flashing red taillight; and "smart" units, which send back data to the crew in the locomotive via radio-based telemetry. The "smart" devices monitor functions such as brake line pressure and accidental separation of the train using a motion sensor, functions that were previously monitored by a crew in the caboose.

In case of a 2-way EOT device, an "arming" procedure is done when the EOT device is set up to insure two way communication and control is established. A Head of Train (HOT) device in a locomotive of a train is manually armed with an EOT device mounted at the rear of the train in a last car. The HOT device has a telemetry transmitter and receiver that provide a locomotive operator with an ability to monitor and operate the associated EOT device. The HOT device also has the ability to initiate a pneumatic emergency at the back of the train by commanding the EOT device to vent brake pipe pressure.

Arming Head of Train (HOT) devices to End of Train (EOT) devices is a process that requires two persons, one manning the EOT device at the rear of the train, and the other manning the HOT device in the locomotive. Typically the person manning the EOT device presses the ARM button on the EOT device to initiate an arming sequence. The person manning the HOT device must then complete the arming sequence by pressing a button on the HOT device (within a short window of time). This process presently cannot be performed by a single person manning the HOT device in the locomotive.

A related mechanism exists where a person manning the EOT device at the rear of a train is replaced by a person in a centralized office location in a railroad yard. This is referred to as "remote arming." In this case, the person at the centralized location uses an EOT device that "pretends" to be the EOT device present on the train itself while the arming process is taking place. This methodology still requires a second person to complete the arming process, but this person is not positioned by the EOT device at the rear of the train. The advantage is that the centrally located person plays the role of "EOT person" for all arming operations in the yard. Limitations of this approach are:

1) The HOT device in the locomotive is arming with another EOT device, which presents itself as the real EOT device mounted at the rear of the train. This has the potential to create unsafe or confusing situations because two EOT devices are temporarily sharing the same identification number (EOT device ID numbers are unique).
2) This scheme works in a yard equipped with the remote arming setup, but not anywhere else where HOT devices and EOT devices may need to be armed.

A revision to the existing protocol (S-9152 AAR Standard) that governs EOT/HOT device communications could conceivably introduce some functionality/behavior change that absolves the EOT from the responsibility of initiating the arming process. This would require massive updates to the entire fleet of HOT devices and EOT devices.

Therefore, there is a need for improvements to end-of-train (EOT) radio telemetry systems used in the railroad industry, such as improvements in arming devices of two-way end-of-train (EOT) radio telemetry systems used in freight trains.

SUMMARY

Briefly described, aspects of the present invention relate to a single person remote arming of a head of train (HOT) device located in a locomotive to an end of train (EOT) device of a freight train located in a last car. In particular, using an EOT device that supports a connection to an asset management service, the EOT device would have the capability of responding to a command sent by the service to initiate an arming sequence. The command to the EOT device may be issued by the person manning the HOT device in the locomotive. After that, the arming sequence may proceed as usual, with the person in the locomotive pressing the button on the HOT device to complete the arming process. In this way, an arming operation may be initiated without the need for a second person at the rear of the train. One of ordinary skill in the art appreciates that such an arming system can be configured to be installed in different environments where such arming is needed, for example, in freight trains.

In accordance with one illustrative embodiment of the present invention, a system to arm one device with another device on a freight train having a locomotive and a last car is provided. The system comprises an end of train (EOT) device disposed in the last car of the freight train and a head of train (HOT) device disposed in the locomotive of the freight train. The EOT device includes a cellular transceiver, a first radio and a soft button which is configured to be virtually pressed in response to an electronic command. The HOT device includes a second radio, a display and a button which is configured to be pressed by a user. The EOT device and the HOT device are configured to communicate via the first and second radios. A web-based service at a central server is configured to receive an initiate arming sequence command from a wireless communication device of the user and issue the electronic command to the EOT device to virtually press the soft button via a web user interface. The first radio is configured to transmit an arming request message to the HOT device for displaying on the display of the HOT device. The user is prompted to press the button of the HOT device to cause the HOT device to proceed with an arming process with the EOT device.

In accordance with another illustrative embodiment of the present invention, a method to arm one device with another device on a freight train having a locomotive and a last car is provided. The method includes providing an end of train (EOT) device in the last car of the freight train, the EOT device including a cellular transceiver, a first radio and a soft button which is configured to be virtually pressed in response to an electronic command, providing a head of train (HOT) device in the locomotive of the freight train, the HOT device including a second radio, a display and a button which is configured to be pressed by a user, wherein the EOT device and the HOT device are configured to communicate via the first and second radios, receiving an initiate arming sequence command from a wireless communication device of the user at a web-based service installed on a central server, issuing the electronic command to the EOT device to virtually press the soft button via a web user interface, using the first radio to transmit an arming request message to the HOT device for displaying on the display of the HOT device and prompting the user to press the button of the HOT device to cause the HOT device to proceed with an arming process with the EOT device.

In accordance with yet another illustrative embodiment of the present invention, a method to arm one device with another device on a freight train having a locomotive and a last car is provided. The method includes receiving an initiate arming sequence command from a wireless communication device of a user at a web-based service installed on a central server, issuing an electronic command to an EOT device disposed in the last car of the freight train to virtually press a soft button at the EOT device, transmitting from the EOT device an arming request message to a HOT device disposed in the locomotive of the freight train for displaying on a display of the HOT device for the user and in response to the arming request message, prompting the user to press a button at the HOT device to cause the HOT device to proceed with an arming process with the EOT device.

DETAILED DESCRIPTION

To facilitate an understanding of embodiments, principles, and features of the present invention, they are explained hereinafter with reference to implementation in illustrative embodiments. In particular, they are described in the context of remotely arming an HOT device to an EOT device using a single person. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

An arming system is provided which is capable of remotely arming an HOT device to an EOT device using a single person. In particular, using an EOT device that supports a live connection to an EOT Phone Home (EOTPH) asset management service, the EOT device would have the capability of responding to a command sent by the EOTPH service to initiate the arming sequence. This would be equivalent to pressing the ARM button on the EOT device itself. The EOTPH service arming command to the EOT device may be issued by the person manning the HOT device in the locomotive. Using a mobile device (such as a smart-phone or a tablet), the person in the locomotive may log in as a user of the EOTPH service. The user may pull up the information regarding the EOT device mounted at the rear of the train (by ID number). This allows further confirmation that the right EOT device was being addressed since the location of the EOT device would be reported to the EOTPH service and would be displayed on a map. The EOTPH service may then provide a way for the user to force the command to be sent to the EOT device, initiating the arming sequence. After that, the arming sequence may proceed as usual, with the person in the locomotive pressing the button on the HOT device to complete the arming process. In this way, an arming operation may be initiated without the need for a second person at the rear of the train.

Accordingly, a two-way end-of-train (EOT) radio telemetry system is described that remotely arms an HOT device to an EOT device using a single person in freight trains. In one embodiment, the EOT device supports a live connection to an asset management service. This service sends a command to the EOT device to initiate an arming sequence. The command to the EOT device may be issued by the person manning the HOT device in the locomotive. In this way, an efficient and more economic arming solution is provided for the freight train by utilizing a remote service and a phone APP.

Figure 1:
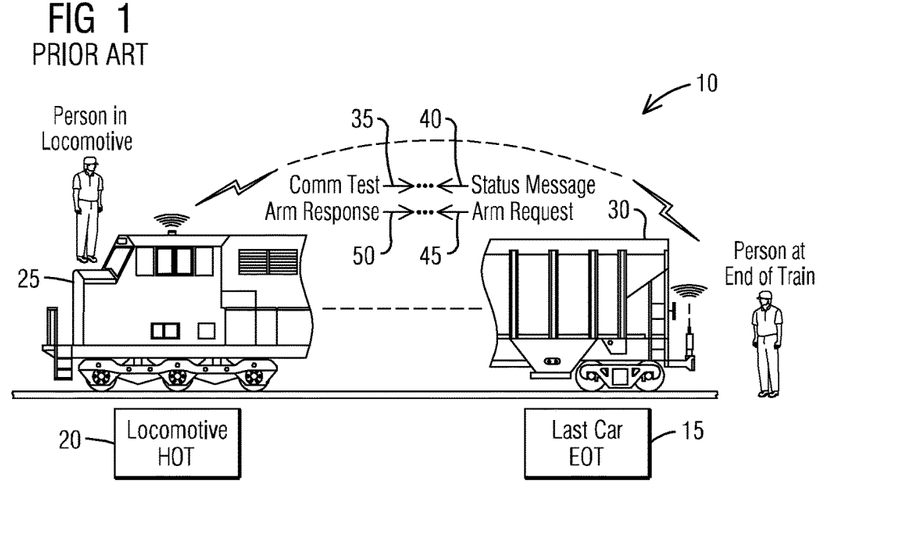
FIG. 1 illustrates a schematic diagram of a prior art 2-person system for arming an HOT device to an EOT device.

FIG. 1 illustrates a schematic diagram of a prior art 2-person system 10 for arming a HOT device 20 to an EOT device 15. Under normal operating conditions, a 2-person protocol for arming the HOT device 20 in a locomotive cab of a locomotive 25 to the EOT device 15 located at a rear of the train in a last car 30 generally calls for the following sequence of actions:

1. The person operating the HOT device 20 in the locomotive 25 performs communications tests 35 with the EOT device 15.
2. The EOT device 15 responds by sending status messages 40 to the HOT device 20.
3. An arming sequence is started by the person at the rear of the train in the last car 30 by pushing an ARM button on the EOT device 15 to generate an arm request message 45.
4. The HOT device 20 displays the message "ARM NOW" to prompt the person in the locomotive 25 to complete the arming process by pressing the ARM button on the HOT device 20 (or computer screen) within 5 seconds and sends out an arm response message 50 to the EOT device 15.
5. The person in the locomotive 25 presses the ARM button.
6. The HOT device 20 is now enabled to send emergency brake activation messages to the EOT device 15 at the rear of the train.

Figure 2:
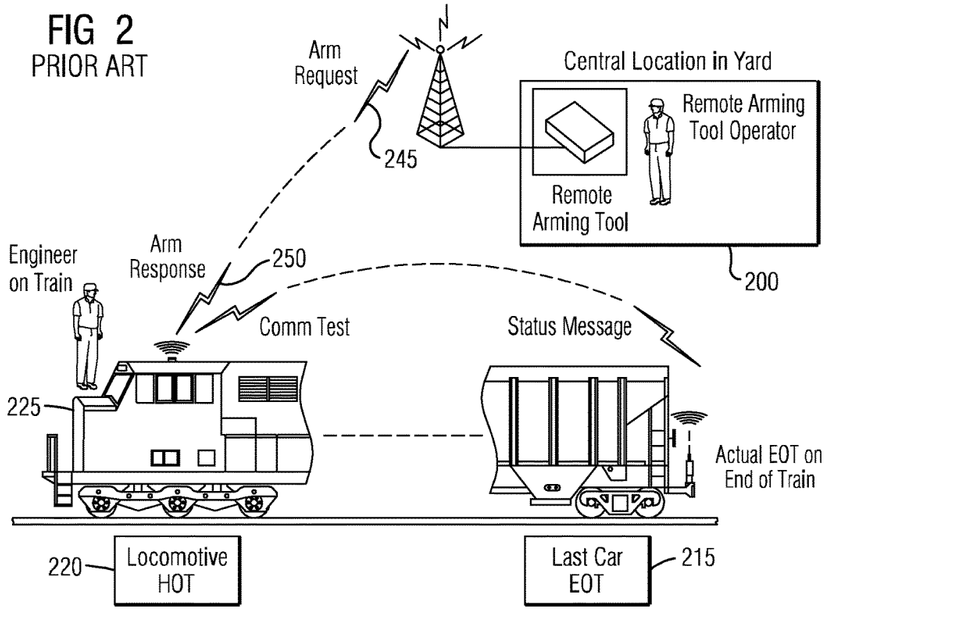
FIG. 2 illustrates a schematic diagram of a prior art remote arming tool for arming an HOT device to an EOT device.

FIG. 2 illustrates a schematic diagram of a prior art Remote EOT Arming Tool 200 for arming an HOT device 220 to an EOT device 215. Remote EOT Arming is an alternative to the existing methodology for arming an EOT device to an HOT device, which currently relies on two persons working together. The Remote EOT Arming Tool 200 is used to initiate an arming sequence with a locomotive's HOT device by simulating an actual EOT device mounted at the end of the train (the Remote EOT Arming Tool 200 is temporarily programmed with the ID number of the EOT device 215 mounted at the end of the train). This is done only after the engineer and the operator of the Remote EOT Arming Tool 200 communicate with each other via voice radio, according to an established protocol. The process is designed to eliminate the need for a second person to press the ARM button on the EOT device 215 mounted at the end of the train.

The motivation for remote arming is to eliminate the need for a second person to operate the EOT device 215 during an arming process. It is implemented by "fooling" the HOT device 220 into believing it is being armed with the EOT device 215 at the end of the train, when in fact it is arming with the Remote EOT Arming Tool 200, which pretends to be an actual EOT device.

In this remote arming application, the Remote EOT Arming Tool 200 need to pretend to be the actual EOT device on the train. Therefore the Remote EOT Arming Tool 200 must be capable of being programmed with any EOT device ID, from 00000 to 99999. For each remote arming operation, the ID of the EOT device 215 on the train is programmed into the Remote EOT Arming Tool 200, which then communicates with the HOT device 220 in a locomotive 225 as though it were the EOT device 215 at the end of the train.

Participation of the Remote EOT Arming Tool 200 in the arming process between the HOT device 220 and the EOT device 215 on the train is limited to sending an arming request message 245 to the HOT device 220 (using the EOT's ID), and receiving an arming confirmation message 250 from the HOT device 220. At this point, the Remote EOT Arming Tool 200 is no longer needed, and the HOT device 220 will continue to communicate with its companion EOT device at the end of the train. In fact, beyond this point the Remote EOT Arming Tool 200 is no longer allowed to communicate while pretending to be the train-mounted EOT device.

The remote arming process relies on the fact that EOT devices are always "armed," in the sense that they are always ready to receive an emergency brake activation command and react to it accordingly. In reality the arming process is for the benefit of the HOT device 220 in the locomotive 225. Once armed, the HOT device 220 allows itself to send emergency activation commands to its authorized EOT device 215.

However, this remote arming still requires two persons but the second person is not standing by the EOT device 215 at the rear of the train. Instead, the second person is in a convenient centralized location in a railroad yard and can assist with arming any number of EOT devices.

Figure 3:
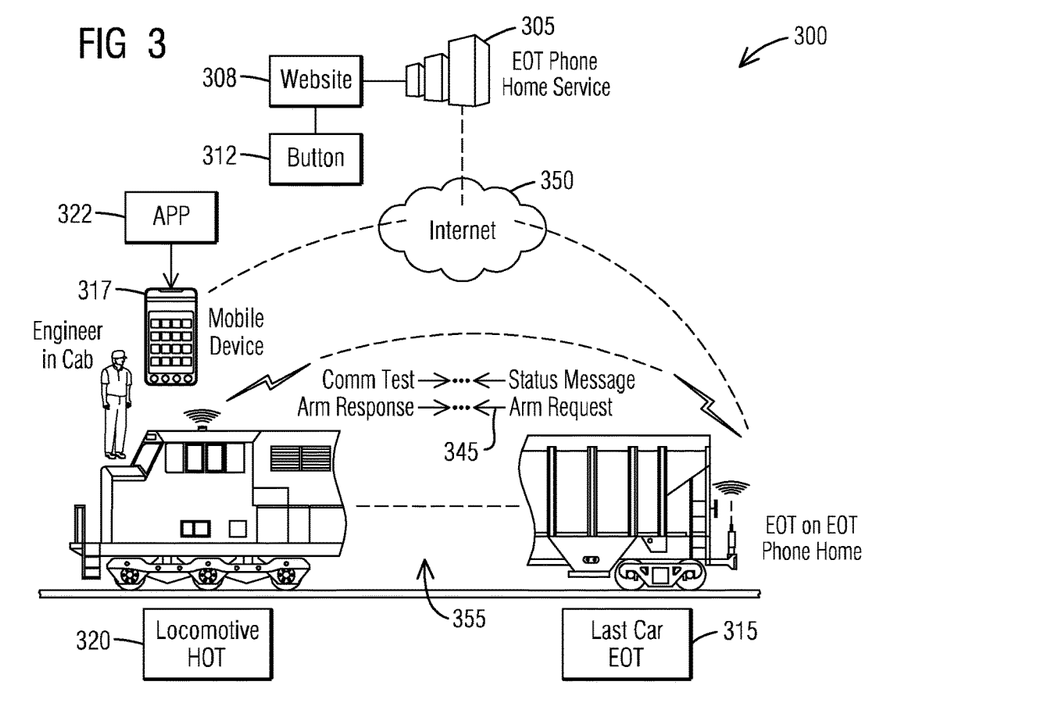
FIG. 3 illustrates a schematic diagram of a single person remote arming system in accordance with one illustrative embodiment of the present invention.

FIG. 3 illustrates a schematic diagram of a single person remote arming system 300 in accordance with one illustrative embodiment of the present invention. As used herein, "single person remote arming system" refers to an arming system operable by one person and it arms an EOT device 315 and a HOT device 320 remotely via use of a soft button. The "soft button" refers to a virtually pressable button, as described herein, which corresponds to an arming technique based on a service and a website. The "arming system," in addition to the exemplary hardware description in FIG. 4, refers to a system that is configured to process radio signals, operated by a controller (including but not limited to a telemetry system controller, a brake system controller, and others). The arming system can include multiple interacting systems, whether located together or apart, that together perform processes as described herein.

An arming process is simplified by providing the EOT device 315 connectivity to an EOT Phone Home (EOTPH) service 305 in that live sessions have been enabled. In this case, the EOT device 315 will be visible and reachable through an EOT Phone Home (EOTPH) website 308. Using the EOTPH service 305, remote arming may be done using an actual EOT device mounted at the rear of the train, effectively eliminating the need for a standalone Remote EOT Arming Tool 200 of FIG. 2.

Specifically, a user will log into the EOTPH website 308. By pulling up information on the EOT device 315 that is going to be armed (mounted at the rear of the train), the user can confirm the geographic location of the EOT device 315 (it should be in the vicinity of the location of the end of the train in the yard). Then the user can click a button 312 on the EOTPH website 308 and cause that actual EOT device 315 to send out an arm request message 345. The process is therefore simplified and the HOT device 320 will be interacting with the real EOT device 315 instead of a simulated clone as is the case in FIG. 2.

Since access to the EOTPH website 308 is available to any internet-connected device, the locomotive engineer could perform the remote arming operation all by himself (without the need for a second person or a centrally located remote arming operator) using a mobile device 317 (smartphone or tablet) logged into the EOTPH website 308. This constitutes a true single-person arming scenario. The EOTPH website 308 on the mobile device 317 may show on the same map the positions of both the EOT device 315 and the user (his mobile device location). This way, the train would be more easily visualized, with the user position defining the head of the train, and the EOT position defining the end of the train.

The mobile device 317 may be a cell phone, tablet, phablet, or the like that is capable of accessing the EOTPH website 308, such as by using a mobile communication standard such as 3G, 4G, or the like. The user may operate an application (hereinafter "APP") 322 that is downloaded to the mobile device 317. The APP 322 may be written in JavaScript using a framework such as Apache Cordova™ or an object-oriented language such as Objective —C for OS X and iOS for Apple. In some embodiments, the communication capability with the EOTPH website 308 may be through Internet 350 as accessed by 3G or 4G or any other mobile communications standard that allows cell phones, computers, and other portable electronic devices to access the Internet wirelessly, for example.

Embodiments of the present invention accordingly enable a reduction of the required manpower from two persons to one person to arm the HOT device 320 to the EOT device 315 on a freight train 355. Another benefit is that the communication occurs between the HOT device 320 in the locomotive 325 and the actual EOT device 315 deployed on the train 355.

The techniques described herein can be particularly useful for arming the HOT device 320 to the EOT device 315 on the freight train 355. While particular embodiments are described in terms of freight trains, the techniques described herein are not limited to freight trains but can be also used in other trains, such as passenger trains, although this type of arming system is more common in freight trains.

Figure 4:
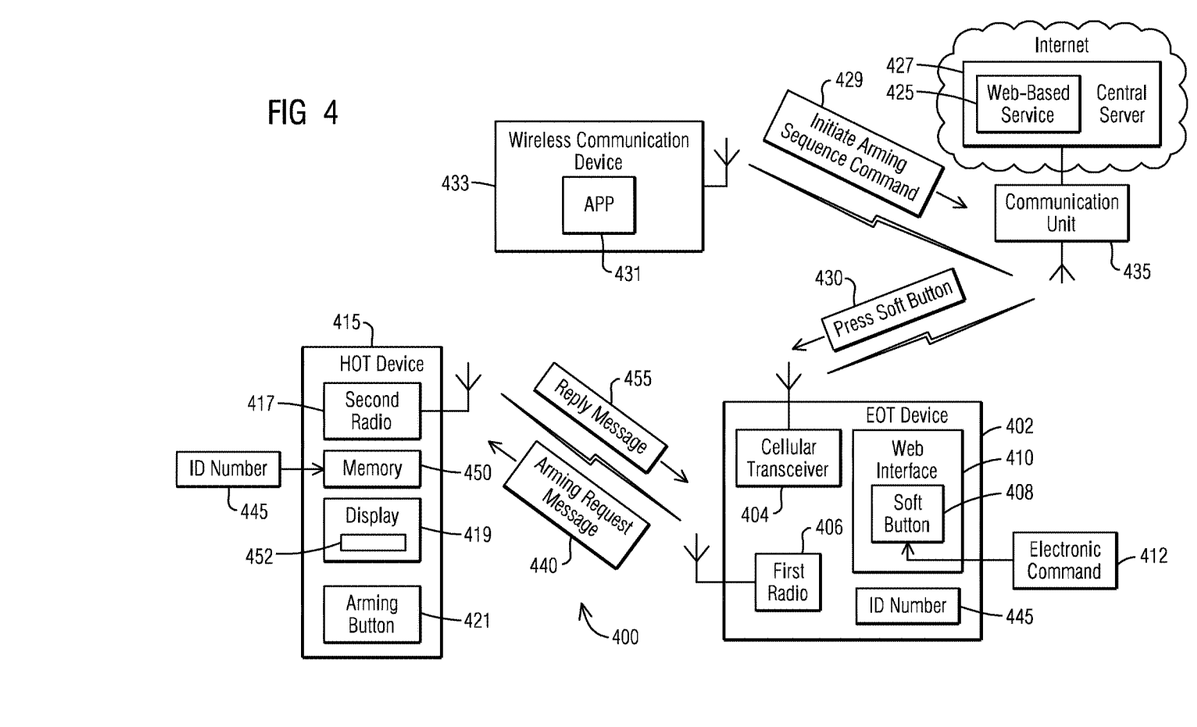
FIG. 4 illustrates a schematic diagram of a detailed single person remote arming system in accordance with one illustrative embodiment of the present invention.

FIG. 4 illustrates a schematic diagram of a detailed single person remote arming system 400 in accordance with one illustrative embodiment of the present invention. The arming system 400 is configured to arm one device with another device on a freight train having a locomotive and a last car.

The arming system 400 comprises an end of train (EOT) device 402 disposed at the end of the train such as in the last car of the freight train. The motivation for remote arming is to eliminate the need for a second person to operate the EOT device 402 during an arming process. The EOT device 402 includes a cellular transceiver 404 with an antenna, a first radio 406 with an antenna and a soft button 408 as part of a web user interface 410. The soft button 408 is configured to be virtually pressed in response to an electronic command 412 to press soft button.

The EOT device 402 may further include a brake line connection/termination, a battery, a flashing tail light and radio telemetry transmitters to send brake pressure data to a receiver in the locomotive. It may also include a small turbine-powered electrical generator that uses air pressure from the brake line to power the first radio 406 of the EOT device 402 and power sensors. The EOT device 402 may transmit the data via a wireless and/or a telemetry link to a Head of Train (HOT) device in the locomotive.

The EOT device 402 may be mounted on the end of freight train in lieu of a caboose. The EOT device 402 may send back data to the crew in the locomotive via radio-based telemetry. The EOT device 402 may monitor functions such as brake line pressure and accidental separation of the train using a motion sensor.

After cars in a train are selected and the train is rejoined, in addition to other tests, the crew must verify that the brakes apply and release on the rear car (to ensure that all of the brake hoses are connected and the angle cocks, or valves, are opened). The engineer may use data from the EOT device 402 to verify that the air pressure reduces and increases at the rear of the train accordingly, indicating that proper brake pipe continuity.

In one embodiment, a two-way communication of brake data from the EOT device 402 to the locomotive enables the engineer to apply the brakes from both ends of the train simultaneously in an emergency. This is useful in the event that a blockage (or an unopened valve) in the train's brake line is preventing dumping the air pressure and causing all of the brakes in the train going into an emergency application. Such a situation could be dangerous, as stopping distance increases with fewer functioning brakes. Dumping the brake line pressure from both the front and rear of the train simultaneously ensures that the entire train applies all of its brakes in emergency.

The arming system 400 further comprises a head of train (HOT) device 415 disposed in front of the train such as in the locomotive of the freight train. The HOT device 415 includes a second radio 417 with an antenna, a display 419 and an arming button 421 which is configured to be pressed by a user such as an engineer of the locomotive. The EOT device 402 and the HOT device 415 are configured to communicate via the first and second radios 406 and 417. In one embodiment, the first and second radios 406 and 417 are a short wave radios operable in an ultra high frequency (UHF) range.

The HOT device 415 may also include several lights indicating telemetry status and rear end movement, along with a digital readout of the brake line pressure from the EOT device 402. It may also include a toggle switch that is being used to initiate an emergency brake application from the rear end. The HOT device 415 may be built into the locomotive's computer system, and the data is displayed on the engineer's computer screen.

The arming system 400 further comprises a web-based service 425 provisioned at a central server 427 that is being coupled to Internet 428. The web-based service 425 is configured to receive an initiate arming sequence command 429 via an application (APP) 431 installed at a wireless communication device 433 of the user. In response to the initiate arming sequence command 429, the web-based service 425 is configured to issue the electronic command 412 to the EOT device 402 to virtually press the soft button 408 via the web user interface 410 in a press soft button message 430. In one embodiment, the wireless communication device 433 may be a mobile phone and the APP 431 may be a software phone application (APP) installed thereon to communicate with the web-based service 425 of the central server 427.

The arming system 400 further comprises a communication unit 435 coupled to the central server 427 to wirelessly communicate with the wireless communication device 433 of the user and communicate with the EOT device 402.

In response to the virtual pressing of the soft button 408, the first radio 406 is configured to transmit an arming request message 440 to the HOT device 415. The HOT device 415 displays the arming request message 440 on the display 419 of the HOT device 415 for the user or the engineer of the locomotive to see. Then the user is prompted to press the arming button 421 of the HOT device 415 to cause the HOT device 415 to proceed with an arming process with the EOT device 402.

A device identification (ID) number 445 of the EOT device 402 may be programmed by the user in the HOT device 415 at a memory 450 of the HOT device 415. The arming request message 440 includes the device ID number 445 of the EOT device 402.

For example, the EOT device 402 has a unique serial number which is included in the transmitted data. That number is entered on the dial on a locomotive EOT receiver when the EOT device 402 is placed on the train. The EOT device 402 may be a 2-way EOT device. In this case, an "arming" procedure is performed when the EOT device 402 is set up to insure two way communication and control is established. Since the EOT device 402 may transmit only brief data "bursts" (like packet radio) several can operate on the same frequency in the same general area.

In operation, when the HOT device 415 receives the arming request message 440 with the same ID number 445 of the EOT device 402 as is programmed in the HOT device 415, a press the button to arm message 452 is displayed on the display 419 for the user by the HOT device 415. The arming process with the EOT device 402 is started if the arming button 421 is pressed in a predefined time period by the user. The arming request message 440 is not processed if the arming button 421 is not pressed in a predefined time period by the user. The HOT device 415 sends a reply message 455 to the EOT device 402 indicating that the arming request message 440 was properly received and asks the EOT device 402 to proceed with a communication test to complete the arming process.

Figure 5:
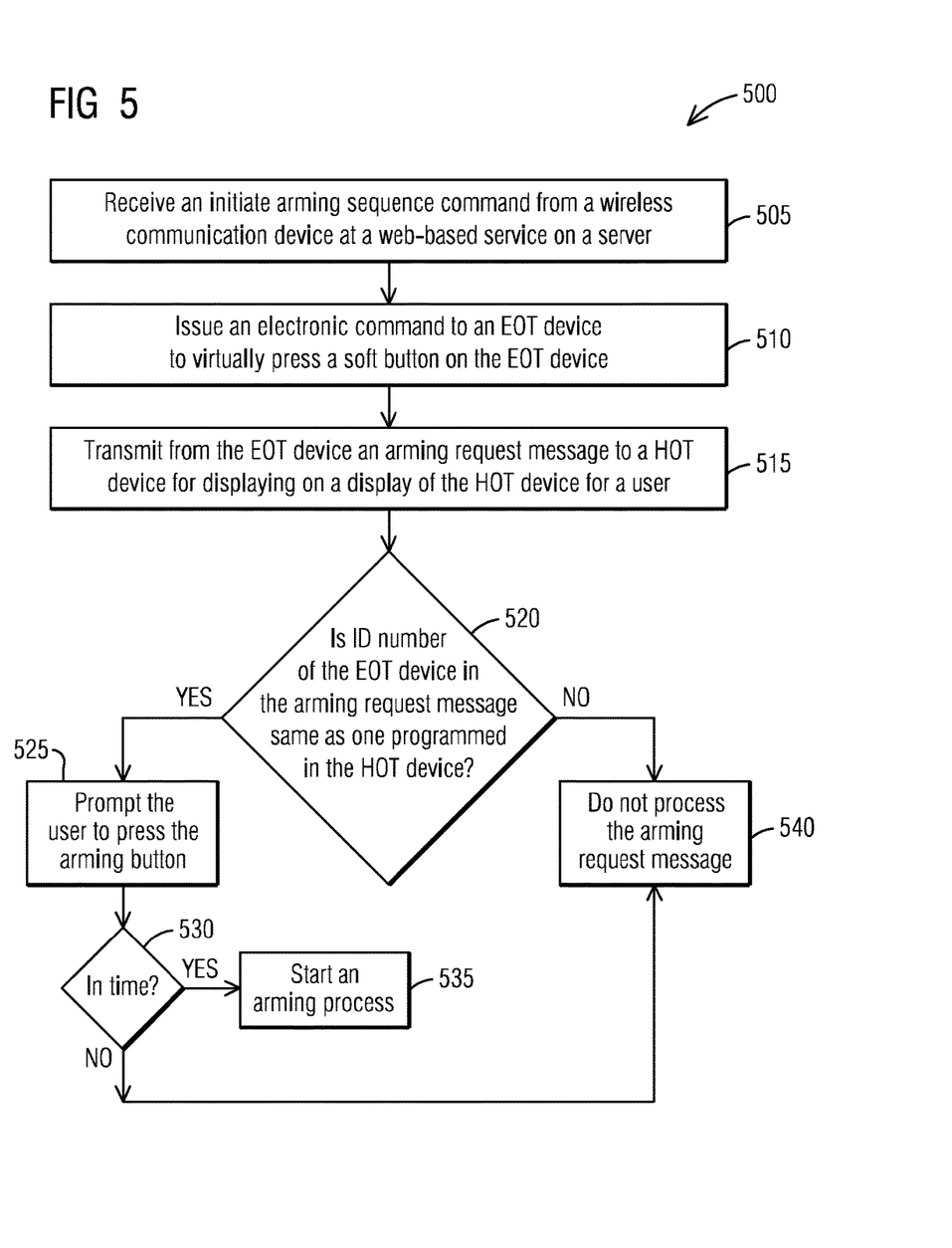
FIG. 5 illustrates a flow chart of a method for arming an HOT device to an EOT device in accordance with an exemplary embodiment of the present invention.

FIG. 5 illustrates a flow chart of a method 500 for arming the HOT device 415 to the EOT device 402 in accordance with an exemplary embodiment of the present invention. Reference is made to the elements and features described in FIGS. 1-4. It should be appreciated that some steps are not required to be performed in any particular order, and that some steps are optional.

The method 500 to arm the HOT device 415 to the EOT device 402 on a freight train having a locomotive and a last car comprises receiving the initiate arming sequence command 429 from the wireless communication device 433 of a user at the web-based service 425 installed on the central server 427 in step 505.

In step 510, the web-based service 425 to issue the electronic command 412 to the EOT device 402 disposed in the last car of the freight train to virtually press the soft button 408 at the EOT device 402. In step 515, the EOT device 402 may transmit the arming request message 440 to the HOT device 415 disposed in the locomotive of the freight train for displaying on the display 419 of the HOT device 415 for the user.

At a decision point 520, the HOT device 415 may compare the ID number 445 of the EOT device 402 received in the arming request message 440 with the ID number 445 of the EOT device 402 programmed in the HOT device 415. If the ID numbers 445 match, in step 525, the user may be prompted to press the arming button 421 at the HOT device 415 to cause the HOT device 415 to proceed with an arming process with the EOT device 402. At a decision point 530, a check is made if the arming button 421 is pressed in a predefined time or not. If yes, then in step 535 an arming process is initiated. If the arming button 421 is not pressed in the predefined time or if the ID numbers 445 don't match, in step 540 the arming request message 440 is not processed.

In one embodiment, a method to arm the HOT device 415 to the EOT device 402 on a freight train having a locomotive and a last car generally calls for the following sequence of actions:

1. The person operating the HOT device 415 in the locomotive performs communication tests with the EOT device 402.
2. The EOT device 402 responds by sending status messages to the HOT device 415.
3. An arming sequence is started by the person operating the HOT device 415 by sending a request via a web-enabled communication device to a web-enabled service on a central server for virtually pushing a soft ARM button on the EOT device 402 using the web-enabled service.
4. The HOT device 415 displays the message "ARM NOW" to prompt the person in the locomotive to complete the arming process by pressing the ARM button on the HOT device 415 (or computer screen) within 5 seconds.
5. The person in the locomotive presses the ARM button.
6. The HOT device 415 is now enabled to send emergency brake activation messages to the EOT device 402 at the rear of the train.

Figure 6:
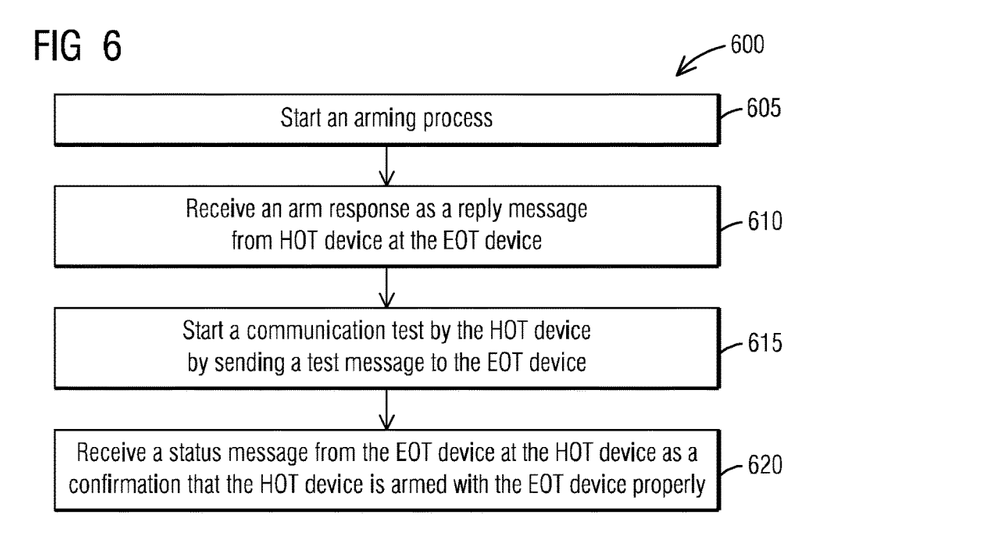
FIG. 6 illustrates a flow chart of an arming process of an HOT device in accordance with an exemplary embodiment of the present invention.

FIG. 6 illustrates a flow chart of an arming process 600 of the HOT device 415 in accordance with an exemplary embodiment of the present invention. Reference is made to the elements and features described in FIGS. 1-4. It should be appreciated that some steps are not required to be performed in any particular order, and that some steps are optional.

In step 605, the arming process 600 is initiated, as noted above with respect to the method 500 of FIG. 5. In step 610, the HOT device 415 sends an arm response as a reply message to the EOT device 402. The reply message is received from the HOT device 415 at the EOT device 402. In step 615, the HOT device 415 starts a communication test by sending a test message to the EOT device 402. In step 620, the EOT device 402 sends a status message to the HOT device 415. The status message is received at the HOT device 415 as a confirmation that the HOT device 415 is armed with the EOT device 402 properly.

Once the EOT device 402 is "armed," it is ready to receive an emergency brake activation command and react to it accordingly. The arming process is for the benefit of the HOT device 415 in the locomotive. Once armed, the HOT device 415 allows itself to send emergency activation commands to its authorized EOT device 402. The HOT device 415 will now continue to communicate with its companion EOT device 402 at the end of the train.

Accordingly, arming the HOT device 415 to the EOT device 402 is a process that now requires one person manning the HOT device 415 in the locomotive. No person manning the EOT device 402 is needed to press the ARM button on the EOT device 402 to initiate an arming sequence. The person manning the HOT device 415 completes the arming sequence by pressing a button on the HOT device 415 (within a short window of time). This process now can be performed by a single person manning the HOT device 415 in the locomotive.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Although the steps, operations, or computations may be presented in a specific order, this order may be changed in different embodiments. In some embodiments, to the extent multiple steps are shown as sequential in this specification, some combination of such steps in alternative embodiments may be performed at the same time.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A system to arm one device with another device on a freight train having a locomotive and a last car, the system comprising:
    an end of train (EOT) device disposed in the last car of the freight train, the EOT device including
        a cellular transceiver,
        a first radio and
        a soft button which is configured to be virtually pressed in response to an electronic command; and
    a head of train (HOT) device disposed in the locomotive of the freight train, the HOT device including
        a second radio,
        a display and
        a button which is configured to be pressed by a user,
    wherein the EOT device and the HOT device are configured to communicate via the first and second radios,
    wherein a web-based service at a central server is configured to receive an initiate arming sequence command from a wireless communication device of the user and issue the electronic command to the EOT device to virtually press the soft button via a web user interface to provide a remote arming of the EOT device by a single person manning the HOT device in that an arming sequence is started by the user operating the HOT device by sending a request via the wireless communication device to the web-based service for virtually pushing the soft button on the EOT device using the web-based service,
    wherein the EOT device is visible and reachable through a website such that when the user clicks a button it causes the EOT device to send out an arming request message,
    wherein the first radio is configured to transmit the arming request message to the HOT device for displaying on the display of the HOT device in response to virtual pressing of the soft button which corresponds to an arming technique based on the web-based service and the website, and
    wherein the user is prompted to press the button of the HOT device to cause the HOT device to proceed with an arming process with the EOT device.

2. The system in claim 1, wherein an identification (ID) number of the EOT device is programmed by the user in the HOT device.

3. The system in claim 2, wherein the arming request message includes the ID number of the EOT device.

4. The system in claim 3, wherein when the HOT device receives the arming request message with the same ID number of the EOT device as is programmed in the HOT device, a press the button to arm message is displayed on the display for the user by the HOT device.

5. The system in claim 4, wherein the arming process with the EOT device is started when the button to arm is pressed in a predefined time period by the user.

6. The system in claim 4, wherein the HOT device sends a reply message to the EOT device indicating that the arming request message was properly received and asks the EOT device to proceed with a communication test to complete the arming process.

7. The system in claim 5, wherein the arming request message is not processed when the button to arm is not pressed in a predefined time period by the user.

8. The system in claim 1, further comprising:
a communication unit coupled to the central server to wirelessly communicate with the wireless communication device of the user and communicate with the EOT device.

9. The system in claim 8, wherein the wireless communication device is a mobile phone having a software application (APP) installed thereon to communicate with the web-based service of the central server.

10. The system in claim 1, wherein the first and second radios are a short wave radios operable in an ultra high frequency (UHF) range.

11. A method to arm one device with another device on a freight train having a locomotive and a last car, the method comprising:
providing an end of train (EOT) device in the last car of the freight train, the EOT device including a cellular transceiver, a first radio and a soft button which is configured to be virtually pressed in response to an electronic command;
providing a head of train (HOT) device in the locomotive of the freight train, the HOT device including a second radio, a display and a button which is configured to be pressed by a user, wherein the EOT device and the HOT device are configured to communicate via the first and second radios;
receiving an initiate arming sequence command from a wireless communication device of the user at a web-based service installed on a central server;
issuing the electronic command to the EOT device to virtually press the soft button via a web user interface, wherein the EOT device is visible and reachable through a website such that when the user clicks a button it causes the EOT device to send out an arming request message;
providing a remote arming of the EOT device by a single person manning the HOT device in that an arming sequence is started by the user operating the HOT device by sending a request via the wireless communication device to the web-based service for virtually pushing the soft button on the EOT device using the web-based service;
using the first radio to transmit the arming request message to the HOT device for displaying on the display of the HOT device in response to virtual pressing of the soft button which corresponds to an arming technique based on the web-based service and the website; and
prompting the user to press the button of the HOT device to cause the HOT device to proceed with an arming process with the EOT device.

12. The method in claim 11, further comprising:
programming an identification (ID) number of the EOT device in the HOT device.

13. The method in claim 12, further comprising:
including the ID number of the EOT device in the arming request message.

14. The method in claim 13, further comprising:
comparing the ID number of the EOT device received in the arming request message with the ID number of the EOT device programmed in the HOT device; and
when the ID numbers are the same, displaying a press the button to arm message on the display for the user.

15. The method in claim 11, further comprising:
providing a communication unit coupled to the central server to wirelessly communicate with the wireless communication device of the user and communicate with the EOT device.

16. The method in claim 15, wherein the wireless communication device is a mobile phone having a software application (APP) installed thereon to communicate with the web-based service of the central server.

* * * * *